United States Patent
Valint, Jr.

[15] 3,665,001
[45] May 23, 1972

[54] AZINYL ORGANOPHOSPHORUS COMPOUNDS

[72] Inventor: Paul L. Valint, Jr., Woodbridge, N.J.
[73] Assignee: Esso Research and Engineering Company
[22] Filed: June 11, 1970
[21] Appl. No.: 45,582

[52] U.S. Cl. ............... 260/239 A, 260/293.73, 260/293.84, 260/293.85, 260/293.9, 260/326.5 A, 260/326.84, 424/200
[51] Int. Cl. ..................... C07f 9/08, C07f 9/12, C07f 9/16
[58] Field of Search ............... 260/239 A, 326.5 A, 294.7 A, 260/293.4 B, 326.82

[56] References Cited

OTHER PUBLICATIONS

Petrov et al., Chem. Abstracts, Vol. 59, Cols. 10106–10107 (1963)
Gaertner, J. Org. Chem., Vol. 32, pages 2972–2976 (1967)

Primary Examiner—Alton D. Rollins
Attorney—Chasan and Sinnock and John Paul Cocoran

[57] ABSTRACT

Azinyl organophosphorus compounds represented by the following structure:

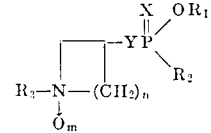

wherein $R_1$ is $C_1$–$C_4$ alkyl, $R_2$ is selected from $C_1$–$C_4$ alkyl optionally substituted by chlorine, bromine or alkoxy, $C_1$–$C_4$ thioalkyl, $C_6$–$C_{10}$ aryl, $C_1$–$C_4$ alkoxy, phenoxy and thiophenoxy optionally substituted with chlorine, bromine or $C_1$–$C_3$ alkyl; $R_3$ can be hydrogen, $C_1$–$C_4$ alkyl, phenyl optionally substituted with chlorine, bromine or $C_1$–$C_6$ alkyl, $C_6$–$C_{13}$ aralkyl, and $C_3$–$C_6$ cycloalkyl, X and Y can be O or S, $m$ can be 0 or 1 and $n$ is an integer ranging from 1 to 3. These compounds have been discovered to possess pesticidal activity, more particularly insecticidal activity.

7 Claims, No Drawings

AZINYL ORGANOPHOSPHORUS COMPOUNDS

This invention relates to derivatives of azinyl organophosphorus compounds and their use as pesticides.

Many organophosphorus compounds have been found useful in recent years as insecticides. Accordingly, it is an object of this invention to provide new organophosphorus compounds that have outstanding insecticidal activity.

In accordance with this invention, new organophosphorus compounds have been prepared which have the following structural formula:

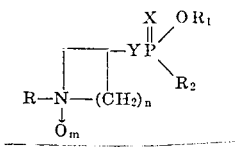

wherein $R_1$ is $C_1-C_4$ alkyl, $R_2$ is selected from $C_1-C_4$ alkyl optionally substituted by chlorine, bromine or alkoxy, $C_1-C_4$ thioalkyl, $C_6-C_{10}$ aryl, $C_1-C_4$ alkoxy, phenoxy and thiophenoxy optionally substituted with chlorine, bromine of $C_1-C_3$ alkyl; $R_3$ can be hydrogen, $C_1-C_4$ alkyl, phenyl optionally substituted with chlorine, bromine or $C_1-C_6$ alkyl, $C_6-C_{13}$ aralkyl, and $C_3-C_8$ cycloalkyl, X and Y can be O or S, m can be 0 or 1 and n is an integer ranging from 1 to 3.

Specific examples included within the above generic formula are as follows:

| Compound No. | |
|---|---|
| 1 | O,O-dimethyl S-(1-iso-propylazetidin-3-yl) phosphorothioate |
| 2 | O,O-diethyl-O-(1-t-butylazetidin-3-yl) phosphate |
| 3 | O,O-diethyl-S-(1-t-butylazetidin-3-yl) phosphorothioate |
| 4 | O,O-diethyl-S-(1-t-butylazetidin-3-yl) phosphorodithioate |
| 5 | O,O-dimethyl-S-(1-t-butylazetidin-3-yl) phosphorodithioate |
| 6 | O-ethyl-S-n-propyl-S'-(1-t-butylazetidin-3-yl) phosphorodithioate |
| 7 | O,O-diethyl-S-(1-cyclohexylazetidin-3-yl) phosphorothioate |
| 8 | O-ethyl-S-1-propyl S'-(1-cyclohexylazetidin-3-yl) phosphorodithioate |
| 9 | O,O-dimethyl-S-(1-phenylazetidin-3-yl) phosphorothioate |
| 10 | O,O-diethyl-O-(1-benzhydrylazetidin-3-yl) phosphate |
| 11 | O,O-diethyl-S-(1-benzhydrylazetidin-3-yl) phosphorodithioate |
| 12 | O,O-diethyl-S-(1-benzhydrylazetidin-3-yl) phosphorothioate |
| 13 | O,O-diethyl-S-(1-t-butyl-1-oxoazetidin-3-yl) phosphorothioate |
| 14 | O,O-dimethyl-O-pyrrolidin-3-yl phosphate |
| 15 | O,O-dimethyl-S-(1-methylpyrrolidin-3-yl) phosphorothioate |
| 16 | O-ethyl-S-1-propyl S'-(1-phenylpyrrolidin-3-yl) phosphorodithioate |
| 17 | O,O-dipropyl-S-(1-chlorophenylpyrrolidin-3-yl) phosphorodithioate |
| 18 | O,O-diethyl-S-(1-benzhydrylpyrrolidin-3-yl) phosphorothioate |
| 19 | O,O-dimethyl-O-(1-methylpiperidin-3-yl) phosphate |
| 20 | O,O-diethyl-S-(1-methylpiperidin-3-yl) phosphorothioate |
| 21 | O,O-diethyl-S-(1-methylpiperidin-3-yl) phosphorothioate |
| 22 | O-ethyl-S-1-propyl S'-(1-methylpiperidin-3-yl) phosphorodithioate |
| 23 | O,O-diethyl-S-(1-methyl-1-oxopiperidin-3-yl) phosphorothioate |
| 24 | O,O-dipropyl-S-(1-phenylpiperidin-3-yl) phosphorodithioate |
| 25 | O,O-dimethyl-S-(1-cyclohexylpiperidin-3-yl) phosphorothioate |
| 26 | O,O-diethyl-O-(1-benzhydrylpiperidin-3-yl) phosphate |

The preparation of the azetidin-3-ol precursors of the claimed compounds has been described by V. R. Gaertner [Tetrahedron Letters, 4691 (1966); J. Org. Chem., 32, 2972 (1967)].

The 3-hydroxy compounds can be converted to phosphate esters by reaction with a phosphorochloridate in the presence of an acid binding agent (B) according to the following schematic equation:

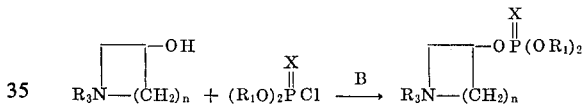

In this reaction, the phosphorochloridate and acid binding agent, i.e. pyridine, triethyl amine, etc., are employed in equivalent amounts in the presence of an aprotic solvent such as diethyl ether, benzene or chloroform. The reaction temperature can very between —20° and 125° C., preferably between 25° and 90° C. The pressure employed is usually atmospheric. The reaction times can vary from 1 hour to 24 hours, preferably 2 to 8 hours.

In order to prepare derivatives in which the azinyl moiety is attached to the phosphorus atom through a sulfur atom, the 3-hydroxy compounds can be converted to readily displaceable groups, such as tosylate or bromide. The resulting compounds can then be reacted with phosphorothioate salts to give rise to the desired esters.

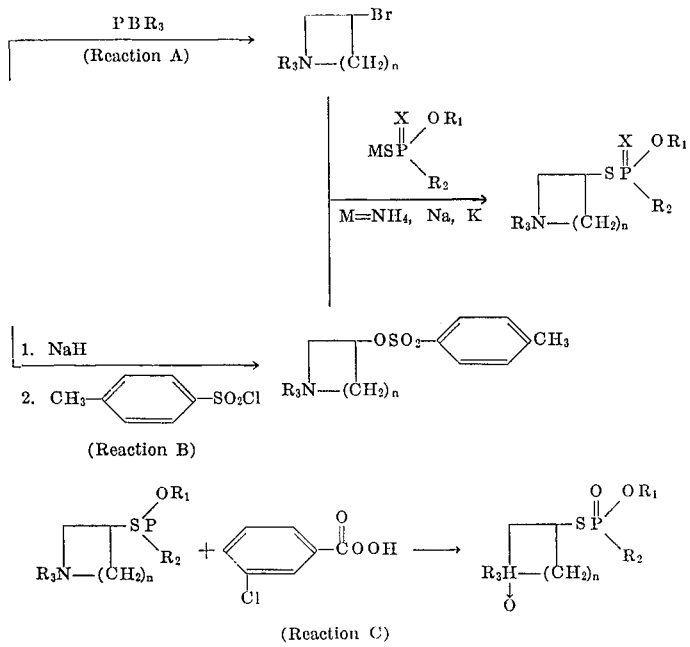

Reaction A:

In this reaction, the phosphorus tribromide is employed in excess in the presence of an aprotic solvent such as diethyl ether, benzene, or chloroform. The reaction temperature can vary from −20° to 100° C., preferably between 25° and 80° C. The pressure employed is usually atmospheric. The reaction times can vary from 4 hours to 48 hours, preferably 10 hours to 20 hours. The desired product is isolated for further reaction to yield phosphate esters.

Reaction B:

In this reaction, sodium hydride is employed in excess in the presence of an aprotic solvent such as diethyl ether, benzene or toluene. The reaction temperature can vary between −20° and 40° C., preferably −5° and 25° C. The pressure employed is usually atmospheric. An equivalent amount of p-toluenesulfonyl chloride is utilized under similar solvent, temperature and pressure conditions. The reaction times can vary from 2 hours to 24 hours, preferably from 4 to 8 hours. The desired product is isolated for further reaction to yield phosphate esters.

In the conversion of the 3-bromo or 3-tosyl azinyl compounds to phosphorotioate esters, stoichiometric amounts of reactants are utilized. The displacement reaction can be carried out with or without a solvent. However, it is usually advantageous to use a solvent which can be a polar organic compound such as nitriles, ketones, alcohols, etc. Hydrocarbons and their chlorinated derivatives such as xylenes, chlorobenzene, etc. are also suitable. The preferred solvents for this displacement reaction are either acetonitrile or methanol.

The reaction temperatures can vary from about 0° to 150° C. preferably from about 25° to 120° C. The pressure of the reactions is usually atmospheric.

Reaction times can vary from 1 to 48 hours, preferably from 2 to 12 hours.

Reaction C:

The N-oxide derivative can be prepared easily by the oxidation of the final organophosphates with oxidizing reagents such as peracids and hydrogen peroxide, etc. In this reaction equivalent amounts of the reactants are employed preferably in the presence of solvent such as chloroform, methylene chloride, etc., the temperature of the reaction can vary from −5° to 70° C., preferably between 0° to 50° C. The reaction time can be from 10 to 80 hours, preferably from 24–50 hours.

Insecticidal compositions of the invention are prepared by admixing one or more of the active ingredients defined heretofore, in insecticidally effective amounts with a conditioning agent of the kind used and referred to in the art as a pest control adjuvant or modifier to provide formulations adapted for ready and efficient application to soil or weeds (i.e., unwanted plants) using conventional applicator equipment.

Thus, the insecticidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredients with a suitable liquid diluent medium. In the case where the compounds are liquids, they may be sprayed in ultra low volume as such. With certain solvents, such as alkylated naphthalene or other aromatic petroleum solvents, dimethyl formamide, cycloketone, relatively high up to about 50 percent by weight or more concentration of the active ingredient can be obtained in solution.

The insecticidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkyl-naphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, lauryl pyridinium bromide, stearyl trimethylammonium bromide, cetyldimethylbenzyl ammonium chloride, lauryldimethylamine oxide, and the like. Generally, the surface-active agent will not comprise more than about 5 to 15 percent by weight of the composition, and in certain compositions the percentage will be 1% or less. Usually, the minimum lower concentration will be 0.1%.

The active compound is, of course, applied in an amount sufficient to exert the desired insecticidal action.

Fertilizer materials, herbicidal agents, and other pest control agents such as insecticides and fungicides can be included in the insecticidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferably solid carriers can be natural occurring minerals— although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur, or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the present compounds.

For some purposes, a resinous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75 percent and preferably of at least about 90 percent, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90 percent by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10 percent by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about six to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be made.

Suitable anionic wetting agents include the alkali metal salts, preferably sodium salts, of sulfuric acid esters or sulfonic acids containing at least 10 atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50 percent by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

Example 1—Preparation of 1-t-Butylazetidin-3-ol

A mixture of 277.5 g. (3.0 moles) of epichlorohydrin and 219 g. (3 moles) of 2-amino-2-methyl propane in 1,200 ml. of methanol was stirred at ambient temperature for 48 hours. The reaction mixture was heated to 60° C. for 72 hours and the methanol was removed under vacuum. The solid residue was basified with 50 percent sodium hydroxide solution and extracted with 2 liters of ether. The ether extracts were dried over sodium hydroxide pellets and the ether was removed under vacuum. The viscous residue was distilled under vacuum to yield 120.5 g. (31 percent) of product as shown by nuclear magnetic resonance (nmr) spectroscopy.

Analyses:Cal'd for $C_7H_{15}NO$: C,65.1; H,11.6; N,10.8.
Found:C,63.4; H,11.6; N,10.8.

Example 2—Preparation of 1-t-Butylazetidin-3-yl-Tosylate

Sodium hydride (11.8 g., 0.3 mole based on 61 percent in mineral oil) was washed with 3 × 150 ml. of hexane and suspended in 250 ml. of benzene. 1-t-Butyl-azetidin-3-ol (20.0 g., 0.155 mole) was added portionwise and the mixture was cooled to 0° C. p-Toluene sulfonyl chloride (24.0 g., 0.16 mole) was added over a 2-hour period and left to stir at ambient temperature for three hours. The excess NaH was destroyed cautiously by the dropwise addition of water. The mixture was then washed with 3 × 200 ml. of water, the benzene layer was dried over MgSO$_4$ and the benzene was removed under vacuum. The residue crystallized on standing to give 30 g. (70 percent) of product. Recrystallized from hexane, mp. 69.5–70° C.

Anal.: Cal'd. for $C_{14}H_{21}NO_3S$: C,59.4; H,7.42; N,4.95
Found: C,59.5; H,7.34; N,4.82

Example 3—Preparation of O,O'-Diethyl O-(1-t-butylazetidin-3-yl)phosphate 1-t-Butylazetidin-3-ol (12.9 g., 0.1 mole) and 17.2 g. (0.1 mole) of O,O-diethyl phosphorochloridate were dissolved in 100 ml. of benzene and 10.1 g. (0.1 mole) of triethylamine were added dropwise. The reaction temperature rose to 35° C. and a white solid precipitated. The mixture was stirred at ambient temperature for 18 hours and the solid was removed by filtration. The filtrate was washed with 5 percent aqueous NaHCO$_3$, dried over MgSO$_4$ and solvent was removed under vacuum to yield 14.8 g. (56 percent) of desired product as shown by nmr spectroscopy.

Anal.: Calc'd. for $C_{11}H_{24}NO_4P$: C,50.0; H,8,96; P,11.5.
Found: C,46.4; H,8.76; P,12.4

Example 4—Preparation of O,O'-Diethyl S-(1-t-butylazetidin-3-yl) phosphorothioate 1-t-Butylazetidin-3-yl tosylate (14.0 g., 0.06 mole) and 15.3 g. (0.08 mole) of ammonium O,O-diethyl phosphorothioate were dissolved in 250 ml. of methanol and heated to reflux for 25 hours. The methanol was removed under vacuum, the residue was dissolved in chloroform and washed with 100 ml. of H$_2$O and 100 ml. of 5% NaHCO$_3$. The chloroform solution was dried over MgSO$_4$ and chloroform was removed under vacuum to yield 14.1g. (84 percent) of the desired product as shown by nmr spectroscopy.

Anal.: Calc'd. for $C_{11}H_{24}NO_3PS$: C,47.0; H,8.54; P11.03.
Found: C,43.0; H,8.53; P,11.0.

Example 5—Preparation of O,O-Diethyl (S-(1-t-butylazetidin-3-yl) phosphorodithioate According to the procedure of Example 4, 14.2 g. (0.05 mole) of 1-t-butylazetidin-3-yl tosylate and 16.2 g. (0.08 mole) of ammonium O,O-diethyl phosphorodithioate were reacted to yield 9 g. (61 percent) of the desired product as shown by nmr spectroscopy.

Anal.: Cal'd. for $C_{11}H_{24}NO_2PS_2$: H,7.68; N,4.48; S,20.2
Found: H,7.70; N,4.96; S,21.7.

Example 6—Preparation of O,O-Dimethyl-S-(1-t-butylazetidin-3-yl) phosphorodithioate According to the procedure of Example 4, 14.2 g. (0.05 mole) of 1-t-butylazetidin-3-yl tosylate and 10.8 g. (0.055 mole) of O,O-dimethyl phosphorodithioate were reacted to yield 10.2 g. (76 percent) of the desired product as shown by nmr spectroscopy.

Anal.: Cal'd. for $C_9H_2ONO_2PS_2$: C,40.2; H,7.43; N,5.20; P,11.5.
Found: C,40.7; H,7.60; N,5.1; P,10.5

Example 7—Preparation of O-Ethyl S-1-propyl S'-(1-t-butylazetidin-3-yl) Phosphorodithioate According to the procedure of Example 4, 42.5 g. (0.15 mole) of 1-t-butylazetidin-3-yl tosylate and 43.1 g. (0.15 mole) of ethyl trimethyl ammonium O-ethyl S-1-propyl phosphorodithioate were reacted to yield 27.4 g. (59 percent) of the desired product as shown by nmr spectroscopy.

Anal.: Calc'd for $C_{12}H_{26}NO_2PS_2$: C,46.3; H,8.36; N,4.50; P,9.97.
Found: C,45.5; H,8.77; N,4.19; P,9.99.

Example 8—Preparation of 1Cyclohexylazetidin-3-ol

According to the procedure of Example 1, 250 g. (2.52 moles) of cyclohexylamine and 183.1 g. (2.52 moles) of eqichlorohydrin were reacted to yield 52.5 g. (13 percent) of desired product as shown by nmr spectroscopy.

Anal.: Cal'd. for $C_9H_{17}NO$: C,69.7; H,11.0; N,9.03.
Found: C,69.8; H,10.8; N,9.28. epichlorohydrin Example 9—Preparation of 1-Cyclohexylazetidin-3-yl Tosylate According to the procedure of Example 2,76.6 g. (0.4 mole) of 1-cyclohexylazetidin-3-ol 43.2g. (1.6 moles) of sodium hydride and 76.2 g. (0.4 moles) of p-toluene sulfonyl chloride were reacted to yield 39 g. (32 percent) of the desired product as shown by nmr spectroscopy.

Example 10—Preparation of O,O-Diethyl(1-cyclohexylazetidin-3-yl) phosphorothioate According to the procedure of Example 4, 7.7 g. (0.025 mole) of 1-cyclohexylazetidin-3-yl tosylate and 7.5 g. (0.04 mole) of ammonium O,O-diethyl phosphorothioate were reacted in acetonitrile to yield 2.4 g. of desired product as shown by nmr spectroscopy.

Anal.: Calc'd. for $C_{13}H_{26}NO_3PS$: C,50.8, H,8.47; P,10.1.
Found: C,49.3; H,8.82; P,9.89.

Example 11—Preparation of O,O-Diethyl S-(1-Benzhydrylazetidin-3-yl) Phosphorodithioate According to the procedure of Example 4, 9.05 g. (0.25 mole) of 1-benzhydrylazetidin-3-yl tosylate and 7.5 g. (0.04 Mole) of ammonium O,O-diethyl phosphorothioate were reacted to give 8.2 g. (84 percent) of the desired product as shown by nmr spectroscopy.

Anal.: Calc'd. for $C_{20}H_{26}NO_3PS$: C,61.4; H,6.65; N,3.59; P,7.92.
Found: C,62.7; H,7.03; N,3.96; P,7.32.

Example 12—Preparation of 3-Bromo-1-Methylpiperidine

3-Hydroxy-1-Methylpiperidine (41.4 g., 0.36 mole) was dissolved in 600 ml. of benzene and 42 ml. of phosphorus tribromide were added dropwise. The reaction mixture was heated to reflux for 2 hours. A 25 percent aqueous solution of NaOH (500 ml.) was added to reaction mixture. The benzene layer was dried over MgSO$_4$ and benzene was removed under vacuum to yield 24.8g. (39 percent) of desired product as shown by nmr spectroscopy.

Example 13—Preparation of O,O-Diethyl (1-methylpiperidine-3-yl) Phosphorothioate According to procedure of Example 4, 14.4 g. (0.082 mole) of 3-bromo-1-methylpiperidine and 15.3 g. (0.082 mole) of ammonium O,O-diethyl phosphorothioate were reacted to yield 13.4 g. (51 percent) of 83 percent pure (glc) desired product as shown by nmr spectroscopy.

Example 14—Preparation of O,O-Diethyl (1-Methylpiperidine-3-yl) Phosphorodithioate According to the procedure of Example 4, 14.4g. (0.082 mole) of 3-bromo-1-methylpiperidine and 17.0 g., (0.082 mole) of ammonium O,O-diethyl phosphorodithioate were reacted to give 15.5 g. (48 percent of 72 percent pure (glc) desired product as shown by nmr spectroscopy.

Example 15—Preparation of O-Ethyl S-1-Propyl S'-(1-Methylpiperidine-3-yl) Phosphorodithioate According to the procedure of Example 4, 12.6 g. (0.07 mole) of 3-bromo-1-methylpiperidine and 16.7 g. (0.07 mole) of potassium O-ethyl S-1-propyl phosphorodithioate were reacted to yield 13.2 g. (35 percent) of desired product as shown by nmr spectroscopy.

Example 16—Preparation of O,O-Diethyl (1-Methyl-1-oxopiperidine-3-yl) Phosphorothioate O,O-Diethyl (1-Methylpiperidine-3-yl) phosphorothioate (3.2 g. 0.012 mole) was dissolved in 100 ml. of CHCl$_3$ and 2.3 g. (0.012 mole) of m-chloroperbenzoic acid in 100 ml. of CHCl$_3$ were added. The resulting mixture was stirred at ambient temperature for 48 hr. The solution was washed with 5%NaHCO$_3$ until neutral (pH=7), dried over MgSO$_4$ and CHCl$_3$ removed under vacuum to yield 1.2 g. (42 percent) of the desired product as shown by nmr spectroscopy.

GENERAL EXPERIMENTAL PROCEDURES FOR BIOLOGICAL TESTING

In the examples which follow, the new azinyl thiophosphate esters were treated in the greenhouse and in the laboratory to determine their biological activity.

The experimental compounds were tested as aqueous emulsions. These emulsions were prepared by dissolving the compound in acetone and dispersing it in distilled water with Triton X-100, an alkylaryl polyether alcohol derived by the reaction of i-cetyl phenol with ethylene oxide, to give spray emulsions containing the desired concentration of the compound. These emulsions were then used in standard laboratory tests described below.

Mexican Bean Beetle: Bean leaves were dipped in the emulsion of the test chemical and allowed to dry. The individual treated leaves were placed in Petri dishes and five Mexican bean bettle larvae introduced into each of the two replicate dishes.

Mites, Contact: Potted bean plants infested with the two-spotted spider mites were placed on a turntable and sprayed with a formulation of the test chemical. The plants were held for seven days and the degree of mite control was rated after this period.

Mites, Systemic: Bean plants were treated by applying 20 ml. of the formulated test chemical to the soil. The mites were transferred to the plants after 24 hours. The plants were held for seven more days and the degree of mite control rated.

Aphid, Contact: Potted nasturtium plants infested with the bean aphids were placed on a turntable and sprayed with a formulation of the test chemical. The plants were held for two days and the degree of aphid control was rated.

Aphid, systemic: Nasturtium plants were treated by applying 20 ml. of the formulated test chemical to the soil. The aphids were transferred to the plants after 24 hours. The plants were held for 48 additional hours and the degree of the Aphid control rated.

Southern Army Worm: Bean leaves were dipped in the emulsion of the test chemical of desired concentration and allowed to dry. The individual treated leaves were placed in petri dishes and five Southern Army larvae introduced into each of the two replicate dishes. The plants were held for 2 days and the degree of control was rated.

Some of the compounds were also tested against other species of coleoptera such as confused flour beetle and spider beetle, as well as adult Mexican bean beetles. They were also tested for their effectiveness to control German cockroaches. Tests were also done to determine their ovicidal action. The compounds were ground active in one or more of these tests

What is claimed is:

1. Compounds of the formula

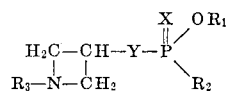

wherein $R_1$ is $C_1$–$C_4$ alkyl; $R_2$ is $C_1$–$C_4$ alkyl, $C_1$–$C_4$ alkoxy, or $C_1$–$C_4$ alkylthio; $R_3$ is t-butyl or cyclohexyl; and each of X and Y is oxygen or sulfur.

2. A compound according to claim 1 which is, O,O-Diethyl-O-(1-t-butylazetidin-3-yl) phosphate.

3. A compound according to claim 1, which is, O,O-Diethyl-S-(1-t-butylazetidin-3-yl) phosphorothioate.

4. A compound according to claim 1 which is, O,O-Diethyl S-(1-t-butylazetidin-3-yl) phosphorodithioate.

5. A compound according to claim 1, which is O,O-Dimethyl S-(1-t-butylazetidin-3-yl) phosphorodithioate.

6. A compound according to claim 1, which is O-Ethyl S-n-propyl S'-(1-t-butylazetidin-3-yl) phosphorodithioate.

7. A compound according to claim 1, which is O,O-Diethyl S-(1-cyclohexylazetidin-3-yl)phosphorothioate.

\* \* \* \* \*

TABLE I.—INSECTICIDAL ACTIVITY OF ORGANOPHOSPHATE DERIVATIVES OF 1-ALKYLAZETIDIN-3-OLS

| | | Percent mortality | | | | | |
|---|---|---|---|---|---|---|---|
| Experimental compounds | Conc. (p.p.m.) | Mexican bean beetle | S. army worm | Mites | | Aphids | |
| | | | | Contact | Systemic | Contact | Systemic |
| O,O-diethyl O-(1-t-butylazetidin-3-yl) phosphate | 250 | 0 | 0 | 50 | 30 | 90 | 0 |
| | 50 | | | | | | |
| O,O-diethyl S-(1-t-butylazetidin-3-yl) phosphorothioate | 250 | 100 | 40 | 100 | 100 | 100 | 90 |
| | 50 | 100 | 0 | 100 | 100 | 100 | 15 |
| O,O-diethyl S-(1-t-butylazetidin-3-yl) phosphorodithioate | 250 | 100 | 0 | 100 | 100 | 100 | 100 |
| | 50 | 60 | 0 | 100 | 100 | 100 | 100 |
| O,O-dimethyl S-(1-t-butylazetidin-3-yl) phosphorodithioate | 250 | 95 | 0 | 0 | 80 | 70 | 0 |
| | 50 | 40 | | | | 0 | |
| O-ethyl S-1-propyl S'-(1-t-butyl-azetidin-3-yl) phosphorodithioate | 250 | 100 | *50 | 100 | 90 | 100 | 0 |
| | 50 | 100 | 10 | 100 | 0 | 100 | 10 |
| O,O-diethyl (1-cyclohexylazetidin-3-yl) phosphorothioate | 250 | 100 | 0 | 100 | 10 | 100 | 10 |
| | 50 | 100 | | 0 | | 80 | |
| O,O-diethyl S-(1-benzhydrylazetidin-3-yl) phosphorothioate | 250 | 90 | 0 | 100 | 0 | 75 | 0 |
| | 50 | 30 | | 70 | | 0 | |

*Conc.=100 p.p.m.

TABLE II.—INSECTICIDAL ACTIVITY OF ORGANOPHOSPHATE DERIVATIVES OF 1-METHYLPIPERIDINES

| | | Percent mortality | | | | | |
|---|---|---|---|---|---|---|---|
| Experimental compounds | Conc. (p.p.m.) | Mexican bean beetle | S. army worm | Mites | | Aphids | |
| | | | | Contact | Systemic | Contact | Systemic |
| O,O-diethyl (1-methylpiperidin-3-yl) phosphorothioate | 250 | 20 | | 10 | 95 | 95 | 100 |
| | 50 | 20 | | 70 | 90 | 95 | 0 |
| O,O-diethyl(1-methylpiperidin-3-yl) phosphorodithioate | 250 | 20 | | 85 | 85 | 95 | |
| | 50 | 5 | | 35 | 90 | 90 | |
| O-ethyl S-1-propyl S'-(1-methylpiperidin-3-yl)phosphorodithioate | 250 | 100 | 60 | 100 | 100 | 10 | 20 |
| | 50 | 100 | | | 85 | 100 | |
| O,O-diethyl (1-methyl 1-oxopiperidin-3-yl) phosphorot'ioate | 250 | 100 | | 100 | 95 | 30 | 100 |
| | 50 | 95 | | 90 | 80 | | 15 |